UNITED STATES PATENT OFFICE.

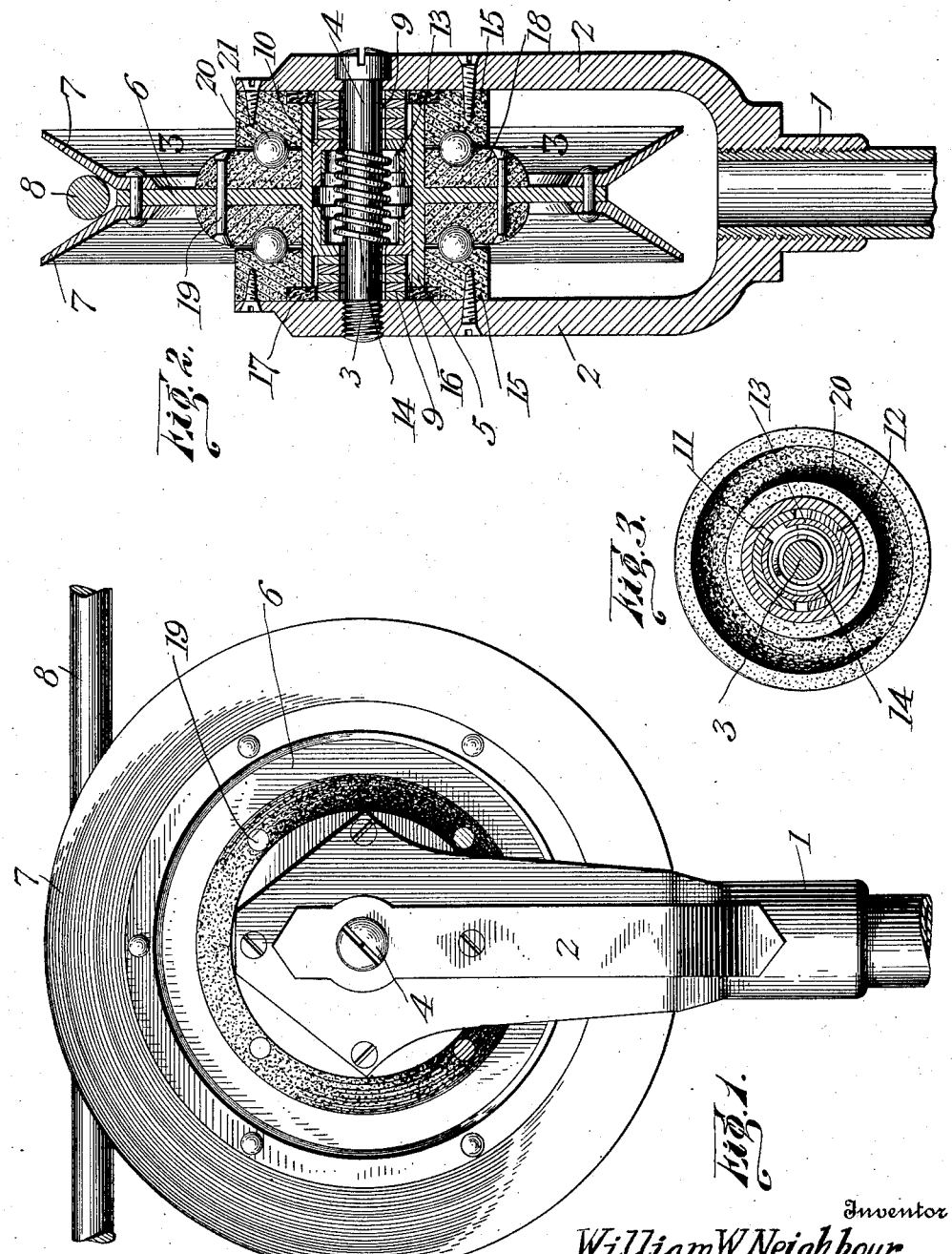

WILLIAM W. NEIGHBOUR, OF DENISON, TEXAS, ASSIGNOR TO SUSPENSION BALL BEARING MANUFACTURING COMPANY, OF NEW YORK, N. Y.

TROLLEY WHEEL AND HARP.

1,025,479.  Specification of Letters Patent.  Patented May 7, 1912.

Application filed January 4, 1910. Serial No. 536,301.

*To all whom it may concern:*

Be it known that I, WILLIAM W. NEIGHBOUR, a citizen of the United States, residing at Denison, in the county of Grayson and State of Texas, have invented new and useful Improvements in Trolley Wheels and Harps, of which the following is a specification.

The invention relates to an improvement in trolley wheels, and is particularly directed to a construction whereby the transmission of the current through the wheel to the harp is maintained at the maximum and the necessary wear of the relatively movable parts reduced to a minimum.

The main object of the present invention is the provision of a trolley wheel in which the wheel proper is supported upon antifriction bearings and in which the current transmission is secured through independent members arranged and constructed to provide the most effective contact with the minimum of friction and wear.

The invention in its preferred details of construction will be described in the following specification, reference being had particularly to the accompanying drawings, in which:—

Figure 1 is a side elevation of a trolley wheel constructed in accordance with my invention. Fig. 2 is a vertical, central, transverse section of the same. Fig. 3 is a vertical section on the line 3—3 of Fig. 2, the balls being omitted.

Referring particularly to the accompanying drawings, the improved wheel structure is mounted in a harp 1 provided with spaced arms 2, between which the wheel is mounted. Near the upper free ends the respective arms 2 are formed with transversely alined openings 3 for the reception of a tie bolt 4, one of the openings 3 being threaded to receive the corresponding threaded portion of the bolt whereby it may be fixed in position.

The wheel proper comprises a barrel or hub 5 of uniform diameter throughout and centrally formed with an annular projection, hereinafter termed a disk 6, through which adjacent the peripheral edges are secured annular flange members 7 providing the usual divergent channel for the reception of the trolley wire 8. The hub 5 of the wheel has a length less than the distance between the inner of proximate surfaces of the arms 2, and an interior diameter materially greater than the diameter of the tie bolt 4. Within the hub and normally disposed adjacent and in contact with each harp arm 2 is a series of washers 9, preferably of copper or other material of good conductivity. Encircling the tie bolt and between the innermost washers of the respective sets are arranged what I term conducting members 10 comprising hollow cylindrical cup-like bodies open at their inner ends and closed at their outer ends except for an opening through which the tie bolt is adapted to pass. The conducting members are divided longitudinally, that is in parallel relation to their edge walls, to provide duplicate sections 11 and 12, each including one-half of the edge wall and one-half of the bottom. A leaf band spring 13 is arranged within each member tending to separate the respective sections so that the edge walls thereof will at all times engage the inner surface of the hub 5 of the wheel. A coil spring 14 is arranged to encircle the tie bolt and bear at its opposing ends against the respective bottom walls of the conducting members whereby to maintain the said members separated the maximum distance and therefore in contact with the innermost washer of each adjacent set. By this means the current is conducted from the barrel of the wheel through the members 10, and the washers 9 to the arms 2.

Secured to the arms 2 on the inner surfaces thereof are duplicate fiber disks 15, said disks being centrally formed with openings of a size to receive the hub 5 of the wheel, whereby said hub is held against other than rotary movement. In this connection it is to be noted that the washers 9 are of a diameter less than that of the hub providing a space 16 between the hub and the peripheral edge of the washers whereby friction incident to the contact of such parts is avoided. To protect the space thus provided against the introduction of lubricant which might otherwise find its way from the parts of the wheel to be lubricated, I prefer to arrange a felt washer 17 in a recess in the outer or arm engaging surface of each disk 15, said washer being of such width as, when in place, to extend immediately adjacent but slightly beyond contact with the peripheral edges of the washers. The length of the barrel and thickness of the respective felt washers is such that the ends of the hub will bear against the relatively inner surfaces of the respective felt washers with the effect to further seal the juncture at this point. Secured upon each side of the wheel disk 6 is a fiber disk 18, having a diameter preferably greater than the diameter of the fixed disks 15 and each centrally formed with an opening encircling the hub 5. The disks 18 are secured to the flange 6 by rivets 19, and are of such thickness that when in position their outer or free surfaces will be slightly spaced from the adjacent surface of the fixed disks 15. Ball channels 20 are formed in the proximate surfaces of the disks 15 and 18, said channels coöperating to form race ways in which are arranged the usual anti-friction balls 21. These balls provide a rotating support for the wheel, and it will be noted that they are effectively separated from any possibility of current deflection, and that any lubricant provided for such bearing cannot by any possibility find its way into the current transmitting elements arranged within the hub of the wheel.

The current transmitting elements are readily renewable in a simple and convenient manner, and the springs 13 and 14 act to maintain the most effective contact between the members 10 and the wheel hub. The current transmission is unbroken and the use of the plurality of washers as 9 serves to minimize the friction at this point.

Having thus described the invention, what is claimed, as new, is:—

1. A trolley wheel including a hub, a harp for supporting the wheel, and current transmitting devices arranged within the hub, said devices including conducting members arranged to rotate with and in contact with the hub, conducting elements bearing between said conducting members and the harp, and in contact with each, and means operating to hold the conducting members in contact with the hub and said elements.

2. A trolley wheel including a hub, a harp for supporting the wheel, means for transmitting the current from the wheel to the harp, said means being arranged within the wheel hub and including conductors engaging and rotating with the hub, and a plurality of washers arranged between and engaging said conductors and harp.

3. A trolley wheel including a hub, a harp for supporting the wheel, means for transmitting the current from the wheel to the harp, said means being arranged within the wheel hub and including conductors engaging and rotating with the hub, and a plurality of washers arranged between and engaging said conductors and harp, said washers being spaced from the hub.

4. A trolley wheel including a hub, a harp for supporting the wheel, means for transmitting the current from the wheel to the harp, said means being arranged within the wheel hub and including conductors engaging and rotating with the hub, a plurality of washers arranged between and forming a conducting medium between said conductors and harp, said washers being spaced at their periphery from the hub, and means for sealing the space at the ends of the hub from the space between the hub and washers.

5. A trolley wheel including a hub, a harp for supporting the wheel, conducting members arranged within the hub and including duplicate sections, means for maintaining said sections spaced the maximum distance permitted by the interior diameter of the hub, and a series of washers arranged between and in contact with the conducting members and harp.

6. A trolley wheel including a hub, a harp for supporting the wheel, conducting members arranged within the hub and including duplicate sections, means for maintaining said sections spaced the maximum distance permitted by the interior diameter of the hub, and a series of washers arranged between and in contact with the conducting members and harp, said washers having a diameter less than the interior diameter of the hub and being disposed within the hub.

7. A trolley wheel including a hub, a harp for supporting the wheel, and current transmitting devices arranged within the hub and electrically engaging the hub and harp, said devices including opposingly positioned cup-shaped members and a series of washers arranged between each of said members and the harp, and a spring for maintaining the respective members spaced the maximum distance longitudinally of the hub.

8. A trolley wheel including a hub, a harp for supporting the wheel, and current transmitting devices arranged within the hub and electrically engaging the hub and harp, said devices including opposingly positioned cup-shaped members and a series of washers arranged between each of said members and the harp, and a spring for maintaining the respective members spaced the maximum distance longitudinally of the hub, each of said members including duplicate sections and a spring operating to space said sections the maximum distance diametrically of the hub.

9. A trolley wheel including a hub, a harp for supporting the wheel, current transmitting devices arranged within the hub and forming electrical connection between the hub and harp, non-conducting disks secured to the harp and formed with openings to receive the hub, non-conducting disks secured to the wheel and encircling
5 the hub, the adjacent faces of the respective disks being formed with ball channels, and anti-friction balls mounted in said channels.

In testimony whereof I affix my signature in presence of two witnesses.

WILLIAM W. NEIGHBOUR.

Witnesses:
C. M. KING,
R. C. FOSTER.

Copies of this patent may be obtained for five cents each, by addressing the "Commissioner of Patents. Washington, D. C."